United States Patent [19]

Johnsen

[11] Patent Number: 4,885,966

[45] Date of Patent: Dec. 12, 1989

[54] SAWING MACHINE

[76] Inventor: Anders Johnsen, Alderbäcken 35, S-781 93 Borlänge, Sweden

[21] Appl. No.: 249,921

[22] PCT Filed: Jan. 22, 1988

[86] PCT No.: PCT/SE88/00022

§ 371 Date: Sep. 23, 1988

§ 102(e) Date: Sep. 23, 1988

[87] PCT Pub. No.: WO88/05370

PCT Pub. Date: Jul. 28, 1988

[30] Foreign Application Priority Data

Jan. 23, 1987 [SE] Sweden .............................. 8700257-2

[51] Int. Cl.[4] ............................................. B27B 5/18
[52] U.S. Cl. ....................................... 83/397; 83/478; 83/489; 83/490
[58] Field of Search ...................... 83/397, 478, 471.2, 83/485, 489, 490; 144/251 R; 30/390, 391

[56] References Cited

U.S. PATENT DOCUMENTS

| 2,996,088 | 8/1961 | Hensley | 83/490 |
| 3,323,507 | 6/1967 | Schuman | 125/14 |
| 3,722,497 | 3/1973 | Hiestand et al. | 125/14 |
| 4,318,324 | 3/1982 | Hall et al. | 83/397 |
| 4,343,213 | 8/1982 | Drixler | 83/397 |

Primary Examiner—Frank T. Yost
Assistant Examiner—Eugenia A. Jones
Attorney, Agent, or Firm—Diller, Ramik & Wight

[57] ABSTRACT

A sawing machine comprises a housing (14), an arm (3) pivotable relative to the housing about an axis (2), a member (4) arranged on the arm, intended for connection to a saw tool and rotatable about an axis spaced from the pivot axis of the arm and parallel thereto, means (19) for rotating the rotatable member, means (38) for pivoting the arm relative to the housing, and an element (53) arranged on the arm, intended for connection to a guard for the saw tool and rotatable for changing the position of the guard relative to the arm depending upon the pivoting position of the arm relative to the housing. A device for automatical rotation of the element (53) comprises a part (30) secured against rotation relative to the housing and located in the area of the pivot axis (2) of the arm as well as means (68) for mechanical force transmission from this part to the rotatable element (53).

10 Claims, 6 Drawing Sheets

SAWING MACHINE

FIELD OF INVENTION AND PRIOR ART

This invention is related to a sawing machine according to the preamble of appendent claim 1.

With certain machines it is intended that the operator manually has to adjust the rotatable element and accordingly the guard for the saw tool in a suitable position. As soon as a change of the position of pivoting of the arm relative to the body is carried out, this necessitates normally also adjustment of the rotatable element and thereby the guard so that it is correctly positioned relative to the saw tool. Such a correct position is of utmost importance to prevent dangerous spreading of material released by the saw tool and is also desirable from the view point of working environment to avoid spreading of cooling fluid supplied to the saw tool. Since normally adjustment of the position of pivoting of the arm relative to the body must be carried out relatively frequently by the operator, the manual adjustment work required thereby as to the position of the rotatable element and thus the guard causes considerable extra work burden on the operator.

Efforts generally in accordance with the preamble of claim 1 have been made to automatize the adjustment of the rotatable element and thereby the guard for the saw tool to be dependent on the adjustment of the arm relative to the body. One has tried to achieve this by arranging, for instance, link arms operating according to the parallelogram control principle, e.g. combined with a worm gear mechanism controlling the mutual position of the link arms, but such efforts have not led to any satisfactory results. The link arms arranged externally on the machine cause a relatively complicated construction and are relatively bulky and in addition the link arm system is very exposed to damage. The link arms often also cause unacceptable limitation of the pivoting movement of the arm.

SUMMARY OF THE INVENTION

The object of the present invention is to reduce disadvantages mentioned and provide an efficiently operating device for automatic rotation of the element and thereby change of the position of the guard relative to the arm in dependence upon the pivoting of the arm relative to the body, which device should be relatively uncomplicated and require small space.

This object is achieved according to the invention by providing the sawing machine with the features appearing by the characterizing portion of appendent claim 1.

Preferable developments of the sawing machine according to the invention are subject to the dependent claims 2-10.

BRIEF DESCRIPTION OF THE DRAWINGS

With reference to the appended drawings, a more specific description of an embodiment example of the invention will follow hereinafter.

In the drawings.

DETAILED DESCRIPTION OF A PREFERRED EMBODIMENT

Figure 3:
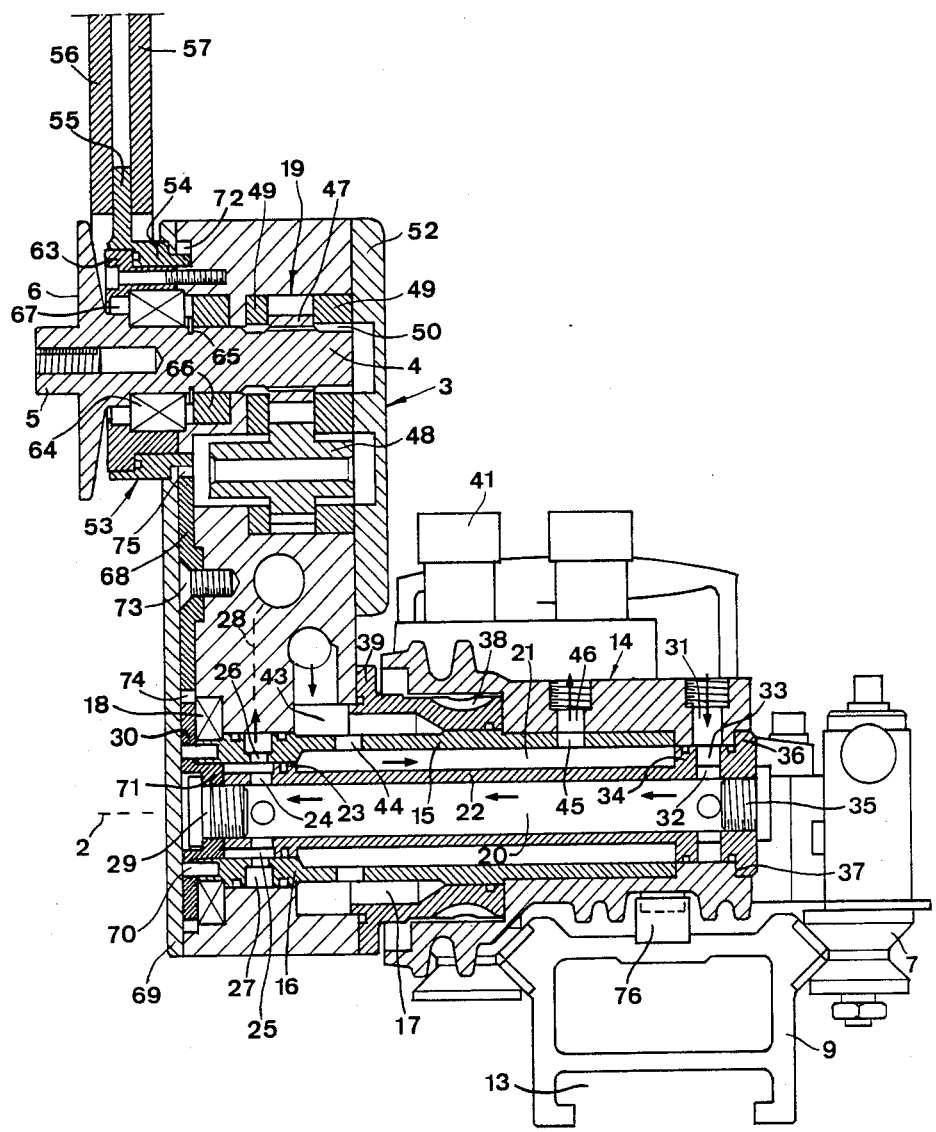
FIG. 3 is a cross section taken along the line III—III in FIG. 1, the pivotable arm of the machine being pivoted upwardly so that the section passes through and along the center of the arm.

The sawing machine according to the invention comprises a body 1 and an arm 3 pivotable relative to the body about an axis 2. On the arm 3 (FIG. 3) a member 4 in the form of a saw spindle is arranged rotatable about an axis spaced from the pivot axis 2 of arm 3 and generally parallel thereto. The spindle 4 comprises a projection 5, to which a saw blade is securable by means of a nut or the like so that the saw blade will abut against a surface 6 on a flange of the saw spindle.

Figures 6, 7:
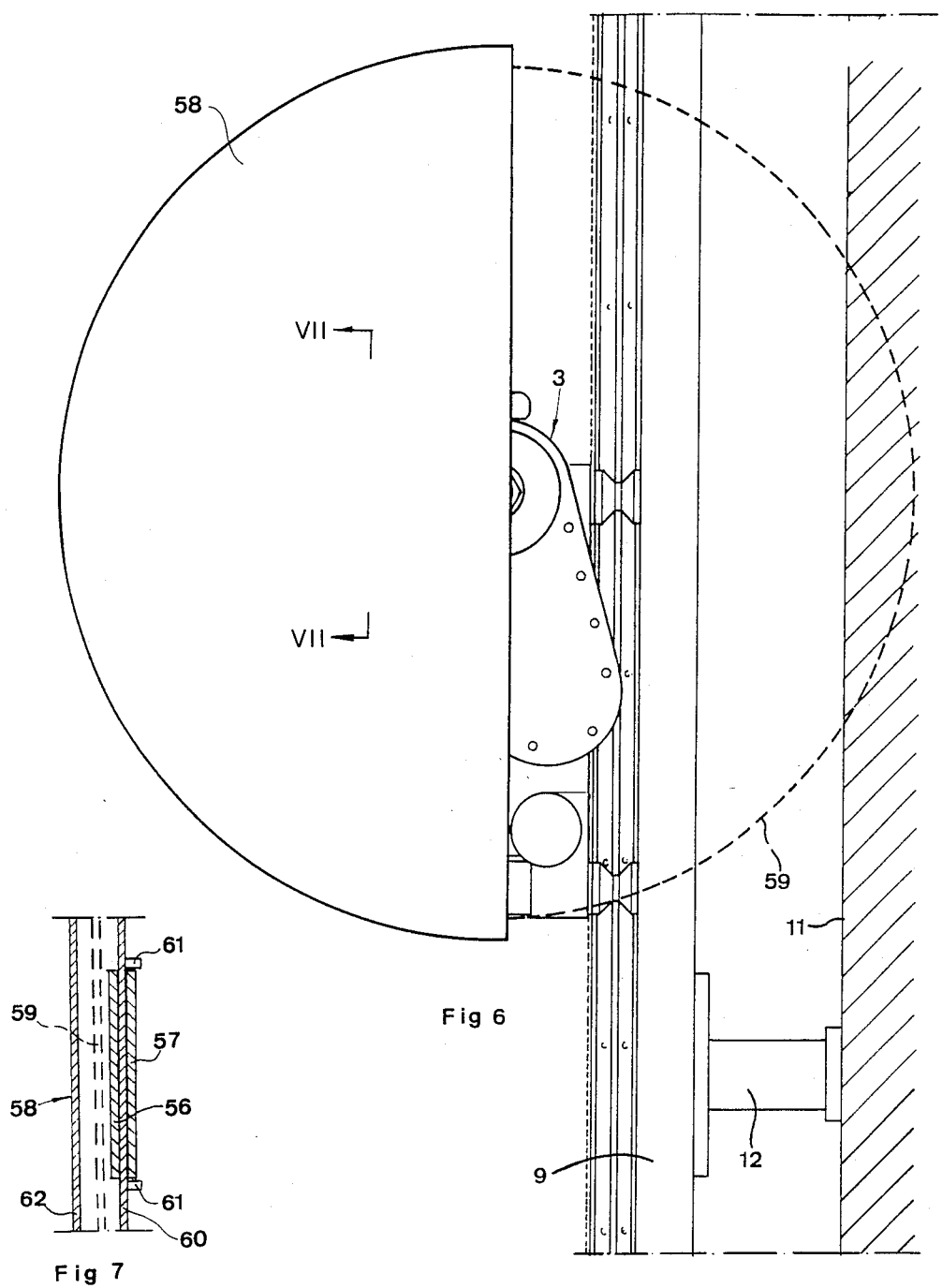
FIG. 6 is a side view of the complete sawing machine including guard for the saw tool, the machine being illustrated attached to a rail and during sawing in e.g. a wall, to which the rail is secured.
FIG. 7 is a cross section along the line VII—VII in FIG. 6.

Body 1 has the character of a carriage comprising four wheels 7, 8. These wheels are intended to co-operate with a rail 9 appearing in FIGS. 3 and 6 such that the carriage 1 is displaceable along the rail. As appears most clearly in FIG. 3, the rail comprises at its opposite longitudinal side edges V-shaped tracks, which converge in a direction away from each other. Wheels 7, 8 have a form complementary to the tracks and taper accordingly towards the centre so that their envelope surfaces have distinct waists. Wheels 8 are, apart from their rotational ability, stationarily arranged on carriage 1 whereas wheels 7 intended for location on the other side of rail 9 may be provided on eccentrics in such a way that one may by means of handles 10 appearing in FIG. 1 move the wheels 7 towards and away from the two other wheels 8 by rotating the eccentrics in suitable bearings provided on carriage 1. The purpose therewith is that carriage 1 shall be removable from rail 9 in its transverse direction when wheels 7 are maximally moved away from wheels 8. It is indicated in FIG. 6 how rail 9 may be secured to an underlayer 11, e.g. a wall surface, by means of support members 12 secured to wall surface 11 by means of expansion-shell bolts or the like and comprising means projecting into the T-shaped groove 13 of rail 9 in order to connect the support members 12 to rail 9.

Figure 1:
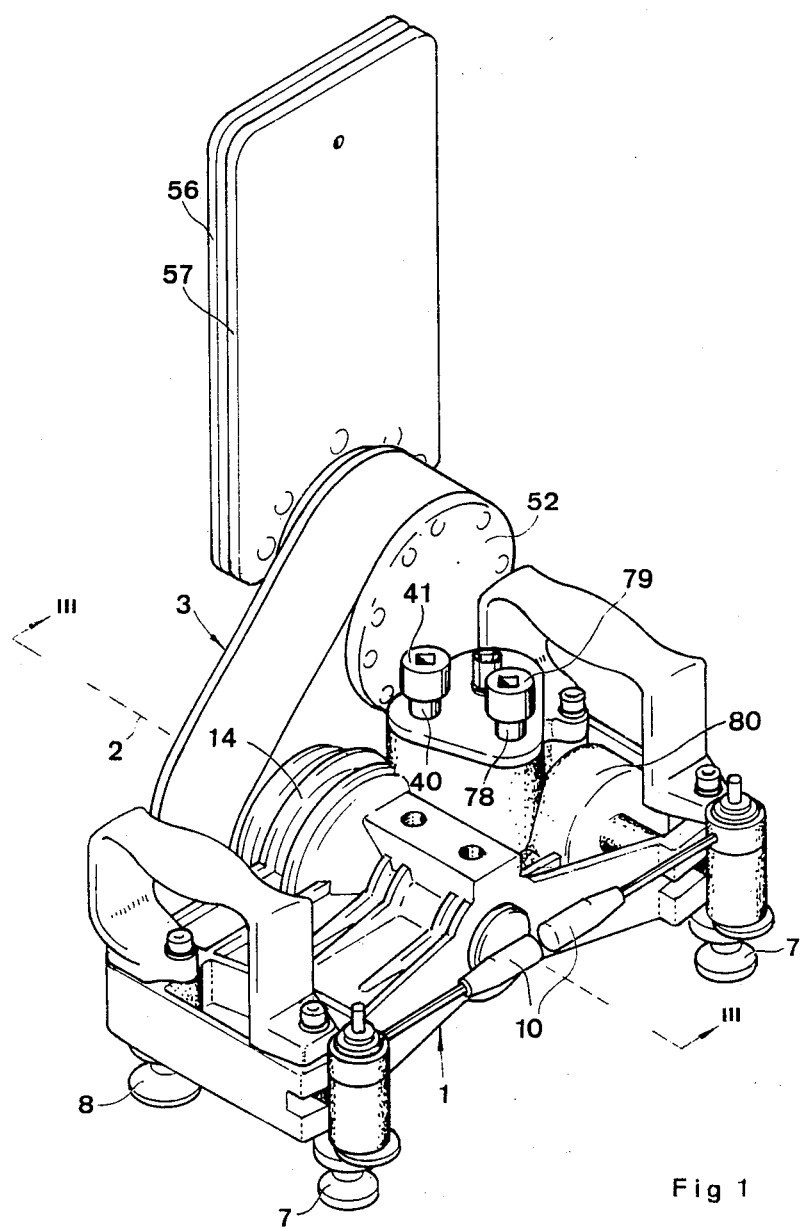
FIG. 1 is a perspective view of the sawing machine from the upper side thereof, the guard for the saw tool having been omitted.
Figure 2:
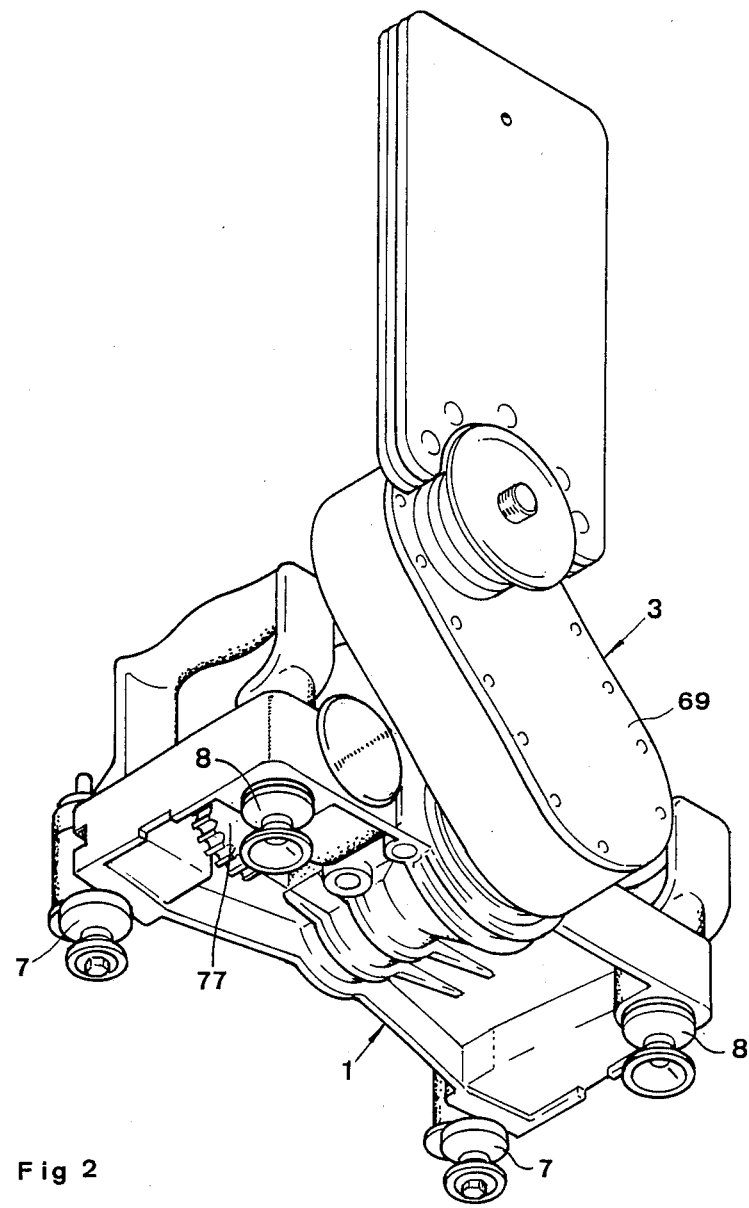
FIG. 2 is a perspective view of the sawing machine viewed in the opposite direction compared to FIG. 1.

Carriage 1 may as appears from FIGS. 1 and 2 comprise handles to simplify carrying thereof.

Carriage 1 comprises a housing 14 which may be a separate piece attached to the carriage or as in the embodiment designed in one piece with the main portion of the carriage. In housing 14 a member 15 (FIG. 3) is arranged, which has an end portion 16 projecting out of the housing through an opening 17 therein. Member 15 is secured against rotation relative to housing 14 and may e.g. be crimped or otherwise secured thereto. Arm 3 is pivotably journalled about the end portion 16 of member 15 protruding out of the housing. Thus, arm 3 comprises a recess, in which end portion 16 of member 15 is received. At least one bearing 18 may be arranged between end portion 16 of member 15 and arm 3. A pressurized fluid motor 19, e.g. a hydraulic motor, is arranged within arm 3 for rotating spindle 4.

Member 15, which accordingly has the character of shaft, is hollow and internally therein there is a channel 20 for supply of pressurized fluid to fluid motor 19. Within sleeve shaft 15, there is also a second channel 21 for discharging return fluid from motor 19. These two channels 20 and 21 are delimited from each other by means of a sleeve 22 arranged within sleeve shaft 15. Channel 20 is located internally in sleeve 22 whereas channel 21 is located externally thereof and, thus, ring-shaped. Sleeve 22 and sleeve shaft 15 adjoin sealingly to each other at 23 at the projecting end portion 16 of sleeve shaft 15. Outwardly of this sealing, sleeve 22 comprises one or more openings 24, through which fluid may flow radially outwardly to a space 25 between sleeve 22 and sleeve shaft 15 and then further radially outwardly through one or more openings 26 in sleeve shaft 15. Openings 26 may open into an annular circumferential recess in the sleeve shaft and fluid flowing thereto flows further on into a further channel 28 in arm 3. Recess 27 is on both sides surrounded by sealings acting between sleeve shaft 15 and the wall of the cavity in arm 3, which receives sleeve shaft 15. The end of sleeve 22 projecting out of housing through opening 17 is closed, e.g. by means of a plug 29. The space 25 is closed in the direction outwardly from housing 14 by means of a sealing between sleeve 22 and sleeve shaft 15 or by means of a part 30 which will be described more in detail hereinafter.

Channel 20 communicates with a fluid inlet opening 31 provided in housing 14. This opening communicates with channel 20 by one or more radial openings 32 in sleeve 22. Sleeve 22 may comprise an annular circumferential recess 33 in the area of openings 32. Sleeve 22 co-operates at 34 sealingly with an internal surface of sleeve shaft 15 or as in the embodiment, with an internal surface of housing 14. The end of sleeve 22 turned away from arm 3 is closed, e.g. by means of a plug 35. At this end sleeve 22 may comprise a radial flange 36 taking support against a shoulder 37 of the housing for limiting movement of sleeve 22 in the direction to the left in FIG. 3.

Means for pivoting arm 3 relative to body 14 comprise a gear rim 38 connected to the arm and located radially inwardly of a portion of the housing and radially outwardly of sleeve shaft 15. This gear rim is formed on an annular part 39, which is attached, e.g. by means of bolts, to arm 3. Part 39 adjoins sealingly and supporting to sleeve shaft 15. Gear rim 38 has the character of a worm wheel and is in engagement with a worm gear not illustrated and attached to an axle 40 (FIG. 1) rotatably journalled to carriage body 1 and comprising a member 41 for connection to a key, by means of which axle 40 and thereby the worm gear may be rotated so as to rotate part 39 and accordingly pivot arm 3 relative to housing 14.

Figure 4:
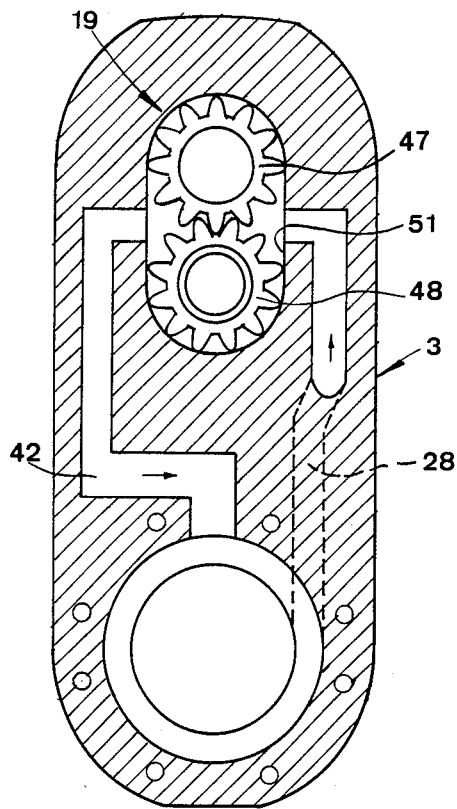
FIG. 4 is a section through the pivotable arm parallel to its plane of pivoting, it being remarked that the view is highly diagrammatical and has been simplified by omitting details otherwise appearing from FIG. 3; the view illustrates the fluid motor built into the arm and the fluid supply thereof.
Figure 5:
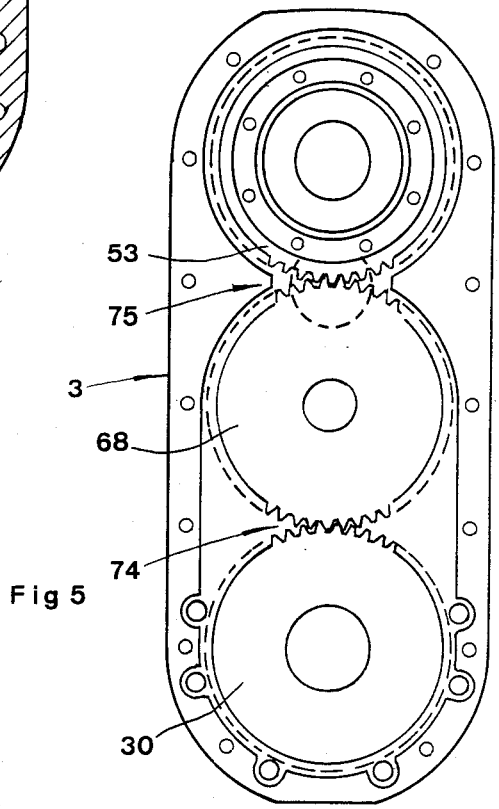
FIG. 5 is a likewise simplified and diagrammatical view illustrating co-operation between components contained in the device for rotating the rotatable element and accordingly changing the position of the guard relative to the arm, the viewing direction being parallel to the pivot axis of the arm.

Return fluid from motor 19 flows via a channel 42 (FIG 4) within arm 3 and further into an annular space 43 delimited by arm 3, sleeve shaft 15 and part 39. Sleeve shaft 15 has one or more openings 44 enabling communication between space 43 and channel 21, which via a radial opening 45 is in communication with an opening 46 for discharge of return fluid from the machine. Openings 31 and 46 are connected via suitable conduits to a pressurized fluid source.

From the above it appears that there are, between sleeve shaft 15 and arm 3, two fluid transferring connections allowing relative rotation, one for pressurized fluid supply and one for fluid return.

Fluid motor 19 is of gear type and comprises a gear 47 (see also FIG. 4) secured against rotation relative to spindle 4 by means of splines or the like. Motor 19 also comprises a second gear 48, which is in engagement with the first 47 but which only runs along freely. Gears 47 and 48 are retained sidewardly by means of plates 49. Needle bearings 50 may be provided between the extreme end of spindle 4 located remote from the location of the saw blade and the adjacent plate 49. Needle bearings are preferably also arranged between the axle portion of gear 48 and the two plates 49. Gears 47 and 48 are located in a space 51 in arm 3 and when fluid via channel 28 flows into space 51, this fluid will hit the gears in their engagement area so as to cause the gears to rotate and thus, gear 47 causes spindle 4 to rotate. The fluid then passes out of space 51 and is returned in the previously described way via channel 42 in arm 3. Space 51 is closed outwardly by means of a cover plate 52.

On arm 3 an element 53 is arranged, which comprises an annular portion 54 as well as a carrying flange 55, which is fixed to two holder plates 56, 57, which are secured to each other and carrying flange 55 by means of bolts or the like so that carrying flange 55 becomes located between the holder plates and so that these will be located mutually spaced. These holder plates are intended to hold a cover like guard 58 designed to cover for instance about half ways the saw tool 59 indicated with dashed lines in FIG. 6. The device is such that a wall 60 of guard 58 is adapted to be received between holder plates 56 and 57 as appears from the section in FIG. 7. This wall 60 of the blade guard may comprise projections 61 located at either sides of plate 57 and having the purpose to prevent movement of guard 58 perpendicularly to the longitudinal extent of plate 57. Plate 56 will be received within the cover like guard 58 and the distance between side walls 60 and 62 of the guard is such that also saw blade 59 will be received between the side walls as appears from FIG. 7. Suitable locking means, for instance screws, tension springs or the like (not illustrated in the drawings) are used for avoiding inadvertent movement of guard 58 out of the engagement with holder plates 56, 57 in their longitudinal direction.

Element 53 is rotatable relative to arm 3 for changing the position of holder plates 56, 57 and accordingly guard 58 relative to arm 3 in dependence upon the pivoting position of the arm relative to carriage 1. Element 53 is rotatable about the same axis as spindle 4 and annular portion 54 of the element surrounds spindle 4 as appears from FIG. 3. A ring 63 is by means of screws secured against rotation relative to arm 3 and acts as locallizing means for rotatable element 53. Radially inside ring 63 a bearing 64 is arranged to cooperate with spindle 4. A locking ring 65 retains the bearing in place and further, there is between spindle 4 and arm 3 a sealing 66 on one side of the bearing and a further sealing 67 between spindle 4 and ring 63 on the other side of the bearing. A device for automatic rotation of element 53 and accordingly change of the position of guard 58 relative to arm 3 depending upon rotation thereof relative to carriage 1 comprises the previously mentioned part 30 secured against rotation relative to the body and located in the area of axis 2 of arm 3 and means 68 for such mechanical force transmission from this part 30 to element 53 that when arm 3 is pivoted relative to carriage 1 in a first direction the element 53 is simultaneously rotated relative to arm 3 in a direction opposite to this first direction, whereas when arm 3 is pivoted relative to carriage 1 in the other direction element 53 is simultaneously rotated relative to arm 3 in a direction opposite to said other direction. In order to always have guard 58 in a correct protective position, the device is such that when arm 3 is pivoted a certain angle relative to carriage 1 element 53 and thus guard 58 are simultaneously rotated an equally great angle relative to arm 3 in opposite direction.

Part 30 is arranged internally in the machine and more specifically within a cover plate 69 on the side of the arm facing away from housing 14. Part 30 may be said to be provided within the arm 3 proper. Part 30 comprises a circumferential gear rim and has more specifically the character of a gear, which by means of screws 70 is secured to the outer end of sleeve shaft 15. The gear has a portion 71 protruding towards housing 14 and abutting against the outer end of sleeve 22 and further adjoining sealingly to the inside of sleeve shaft 15. Plug 29 has a thread engaging with an internal thread in sleeve 22 and a widened head supporting against a shoulder on portion 71 of gear 30 on the side facing away from the end of sleeve 22 so that plug 29 tends to draw sleeve 22 towards the left in FIG. 3. Gear 30 and its gear rim are generally concentric to pivoting axis 2 of arm 3. Also element 53 comprises a gear rim 72. Transmission means 68 and gear ring 72 of element 53 are located internally in arm 3 behind cover plate 69. Transmission means 68 is in the embodiment formed by a gear, which is rotatably arranged in arm 3 about a pin 73. Gear 68 engages in the area of 74 with gear 30 and in the area of 75 with gear rim 72 of element 53. To achieve the equality discussed above as far as the size of the rotational movements between arm 3 and carriage 1 and between element 53 and arm 3 is concerned, gears 30 and 68 and gear rim 72 have equally large diameters.

Rail 9 comprises (FIG. 3) a longitudinal cog way 76. It appears from FIG. 2 that carriage 1 comprises a gear 77 adapted to co-operate with the cog way. Thus, on rotation of gear 77 carriage 1 will be displaced along rail 9. To achieve this rotation of gear 77 a worm gear engages with said gear and this worm gear is arranged on an axle 78 (FIG. 1) with suitable design or connection member 79 to be imparted a rotation by suitable key or the like. Gear 77 is in FIG. 1 located under the housing like projection 80.

When using the machine according to the invention, rail 9 is first mounted on the wall or surface to be provided with a saw cut and subsequently machine 1 is applied on the rail, arm 3 being so adjusted that the saw blade is free from the wall surface. Thereafter rotation of the blade is initiated and by pivoting arm 3 the operator may now adjust the desired depth of cut, during which adjustment blade guard 58 always will be incorrect position relative to the saw blade and wall surface without the operator having to manually readjust the guard. Thereafter the operator displaces the machine along rail 9 while a saw cut is being made in the wall surface.

DESCRIPTION OF ALTERNATIVE EMBODIMENTS

It is evident that the sawing machine may be modified in several ways within the scope of invention. Instead of using transmission means 68 in the form of a gear it would be possible to put a chain around gear 30 and gear rim 72 of element 53. Instead of a chain it would be possible to use e.g. a toothed belt. For the rest it is not necessary that part 30 is designed as a gear. Part 30 could instead have the character of a drum, pulley, rope disc or the like secured against rotation relative to the body and adapted for corporation with a flexible traction force transmitting element in the form of a rope, line, belt or V-belt. In analogical way, the rotatable element 53 would in such a case not have any gear rim but instead a corresponding drum, pulley or rope disc. In these latter cases some slippage in the transmission could occur in case the guard accidentally would hit any hindrance, a fact which possibly could be an advantage even if such embodiment could necessitate adjustments of the position of the rotatable element 53.

Figure 8:
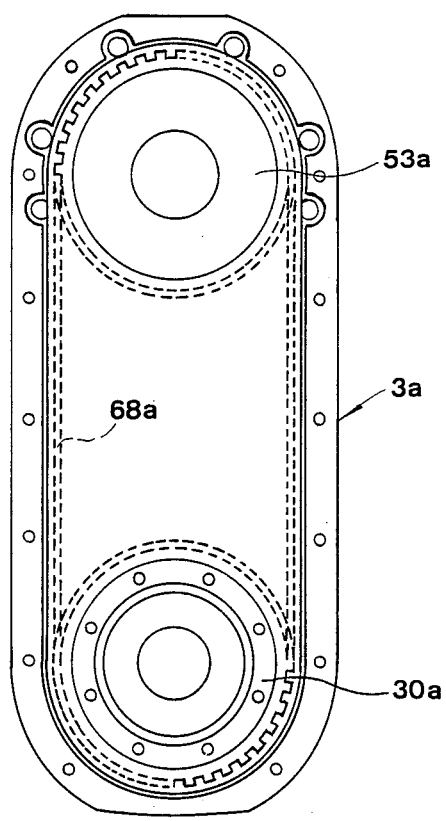
FIG. 8 is a view similar to FIG. 5 but illustrating an alternative embodiment.

In FIG. 8 it is illustrated as an example how said transmission means is formed by a flexible traction force transmitting element 68a put in a loop about part 30a secured against rotation relative to the body, said part having the character of a toothed wheel, and about the rotatable element 53a likewise having the character of a toothed wheel. The toothed belt 68a has more specifically the character of closed loop engaging with components 30a and 53a radially outwardly of their axes of rotation.

Further it is to be mentioned that more than one wheel 68 could be arranged for transmitting between wheels 30 and 53. For instance, wheel trains comprising arbitrary but uneven numbers of wheels could be arranged for transmitting forces between wheels 30 and 53. Finally it is to be pointed out that wheels 30, 68 and 53 must not necessarily have the character of gears; it would be possible to design these wheels so as to engage mutually by friction, said wheels having on their engagement surfaces friction increasing design or means. Common to the embodiments described is that they cause the advantage that arm 3 and rotatable element 53 may be rotated unlimitedly turn after turn relative to the body.

I claim:

1. A sawing machine comprising a body (1), an arm (3) pivotable relative to the body about an axis (2), a member (4) on the arm, said member being arranged for connection to a saw tool (59) and being rotatable about an axis spaced from the pivot axis of the arm and generally parallel thereto, means (19) for rotating the rotatable member (4), means (38, 40) for pivoting the arm relative to the body, an element (53) rotatably arranged on the arm and adapted to be connected to a guard (58) for the saw tool, and a device comprising power transmission means (68, 68a) and arranged for automatic rotation of the element (53) and thereby change of the position of the guard (58) relative to the arm (3) in dependence upon pivoting of the arm relative to the body, so that when the arm (3) is pivoted relative to the body in a first direction the rotatable element is simultaneously rotated relative to the arm in a direction opposite to this first direction, whereas when the arm is pivoted relative to the body in the other direction the rotatable element is simultaneously rotated relative to the arm in a direction opposite to said other direction, characterized in that the device for rotating the element (53) and change of the position of the guard (58) relative to the arm (3) comprises a part (30) secured against rotation relative to the body, located in the area of the pivot axis (2) of the arm and being generally concentric thereto, and that said power transmission means (68, 68a) for transmitting power from the part (30) secured against rotation relative to the body to the rotatable element (53) for rotation thereof on pivoting of the arm comprise at least one force transmitting element.

2. A sawing machine according to claim 1, characterized in that the part (30) secured against rotation relative to the body is arranged internally in the machine.

3. A sawing machine according to claim 1 or 2, characterized in that the part (30) secured against rotation relative to the body comprises a gear rim engaging with a gear rim on said at least one force transmitting element.

4. A sawing machine according to claim 2, characterized in that the rotatable element (53) comprises a gear rim (72) engaging with a gear rim on said at least one wheel (68).

5. A sawing machine according to claim 2, characterized in that said force transmitting element and a portion of the rotatable element (53) in engagement therewith are located internally within the arm (3).

6. A sawing machine according to any preceding claim, characterized in that the body comprises a housing (14), to which is connected a shaft (15) secured against rotation relative to the housing and comprising a portion (16) extending out of the housing, that the arm (3) is pivotably journalled about said portion and that the part (30) secured against rotation is formed on or attached to the shaft secured against rotation.

7. A sawing machine according to claim 6, characterized in that said means for pivoting the arm (3) relative to the body (1) comprise a gear rim (38) arranged on the arm and located radially within a portion of the housing and radially outside the shaft (15) secured against rotation.

8. A sawing machine according to claim 7, characterized in that the gear rim (38) on the arm is arranged on a ring shaped part (39) adjoining radially supporting to the shaft (15) secured against rotation.

9. A sawing machine according to claim 6, characterized in that the shaft (15) secured against rotation is hollow and that internally therein there is a first channel (20) for supply of fluid to a fluid motor (19) arranged in or on the arm (3) in order to cause rotation of the rotatable member (4), said shaft (15) secured against rotation comprising in the area adjacent to the arm (3) at least one hole (26) for transferring fluid from the first channel (20) to a further channel (28) in the arm.

10. A sawing machine according to claim 9, characterized in that internally in the shaft (15) secured against rotation there is a second channel (21) for discharging return fluid from the motor (19) and that these channels (20, 21) are delimited from each other by means of a sleeve (22) arranged within the shaft (15) secured against rotation so that one of the channels extends within the sleeve whereas the other extends outside of the sleeve.

* * * * *